United States Patent [19]
Gery

[11] Patent Number: 5,942,962
[45] Date of Patent: Aug. 24, 1999

[54] DIPOLE MAGNETIC STRUCTURE FOR PRODUCING UNIFORM MAGNETIC FIELD

[75] Inventor: Jean-Marc Gery, Beverly Hills, Calif.

[73] Assignee: Quadrant Technology, Sunnyvale, Calif.

[21] Appl. No.: 09/165,708

[22] Filed: Oct. 2, 1998

[51] Int. Cl.⁶ ...................................................... H01F 7/00
[52] U.S. Cl. ....................... 335/297; 335/296; 335/298; 335/306
[58] Field of Search .................................. 335/281, 284, 335/296, 297, 298, 302, 304, 306; 324/318, 319, 320

[56] References Cited

U.S. PATENT DOCUMENTS

| | | |
|---|---|---|
| 4,186,364 | 1/1980 | Hanaoka . |
| 4,544,421 | 10/1985 | Springer . |
| 4,672,346 | 6/1987 | Miyamoto et al. ...................... 335/296 |
| 4,827,235 | 5/1989 | Inomata et al. . |
| 5,089,798 | 2/1992 | Miyata . |
| 5,382,301 | 1/1995 | Ohkubo et al. . |
| 5,539,366 | 7/1996 | Dorri et al. . |
| 5,729,188 | 3/1998 | Siebold et al. . |
| 5,754,085 | 5/1998 | Danby et al. . |

*Primary Examiner*—Lincoln Donovan
*Assistant Examiner*—Raymond Barrera
*Attorney, Agent, or Firm*—Robert S. Kelly

[57] ABSTRACT

A dipole magnet structure includes a pair of spaced pole pieces and a pair of permanent magnets secured in alignment with the pole pieces and connected by a magnetically conductive yoke for producing a uniform magnetic field within a predetermined spacial volume therebetween. The opposed faces of the pole pieces are dish-shaped with a flat center area surrounded by an outwardly and forwardly curved rim surface which extends from the center area and which increases in forward curvature as it extends away from the center area to insure homogeneity in the predetermined spacial volume as defined by the space between the pole piece center areas.

17 Claims, 3 Drawing Sheets

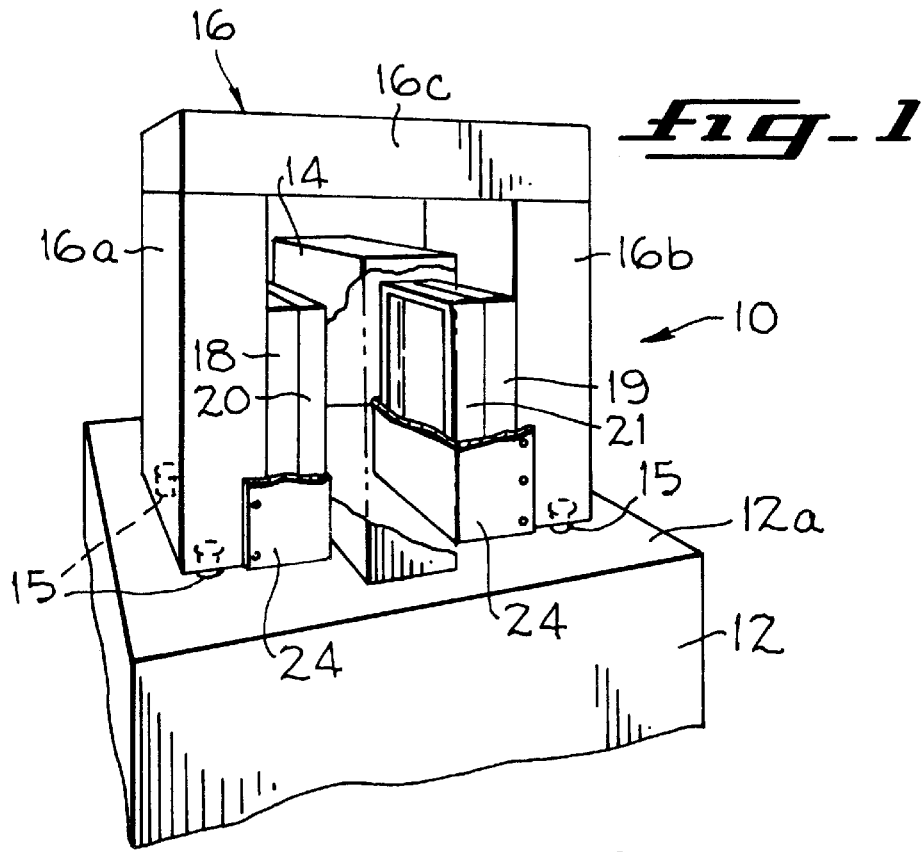
fig_1
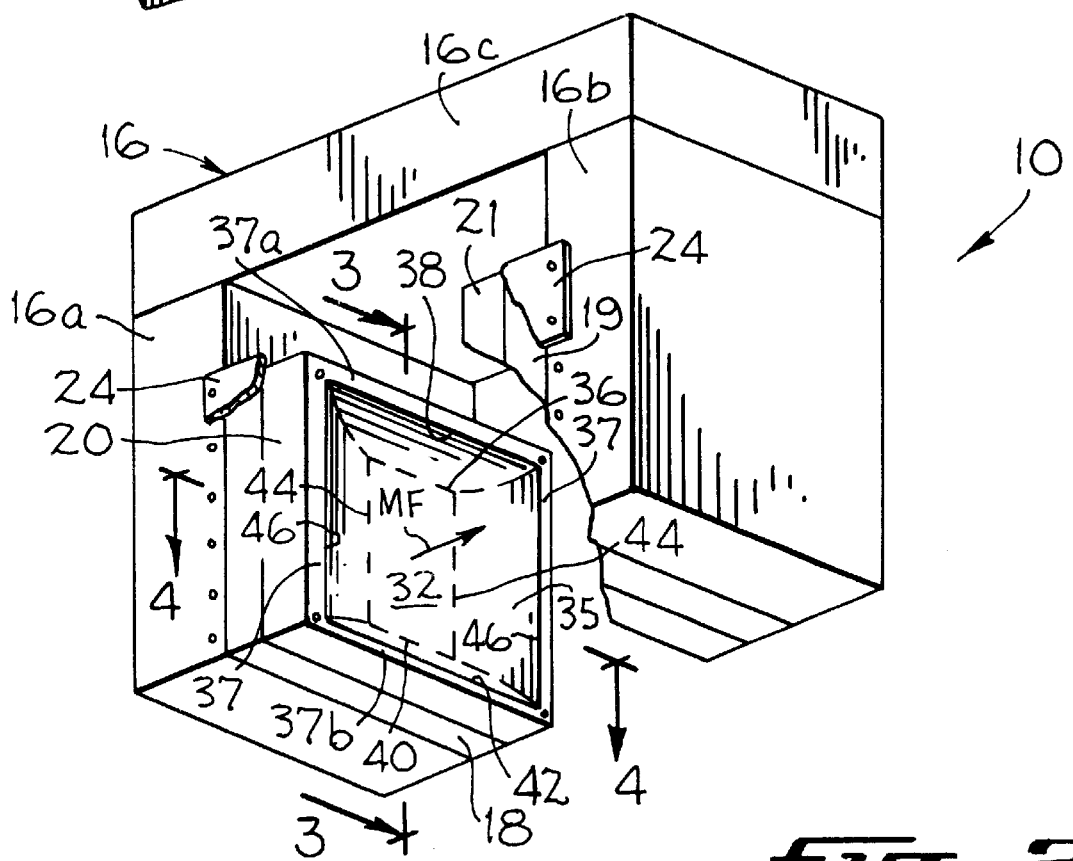
fig_2

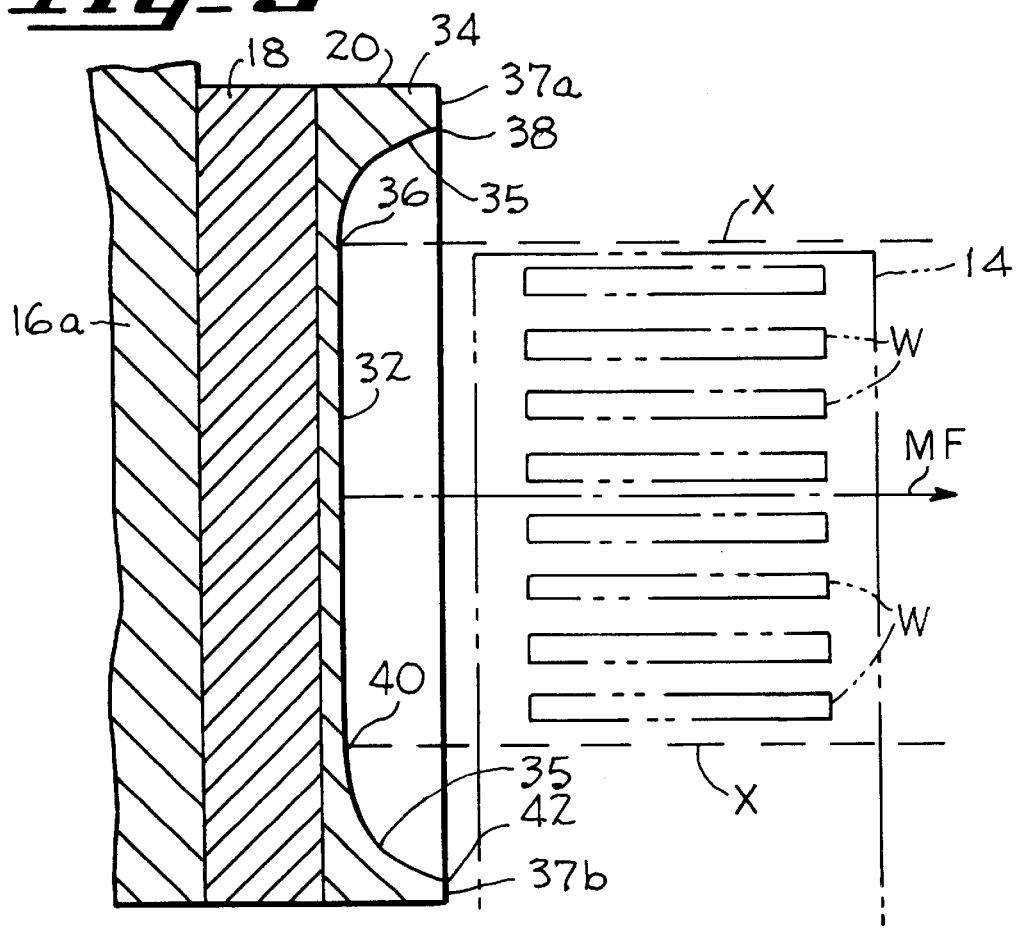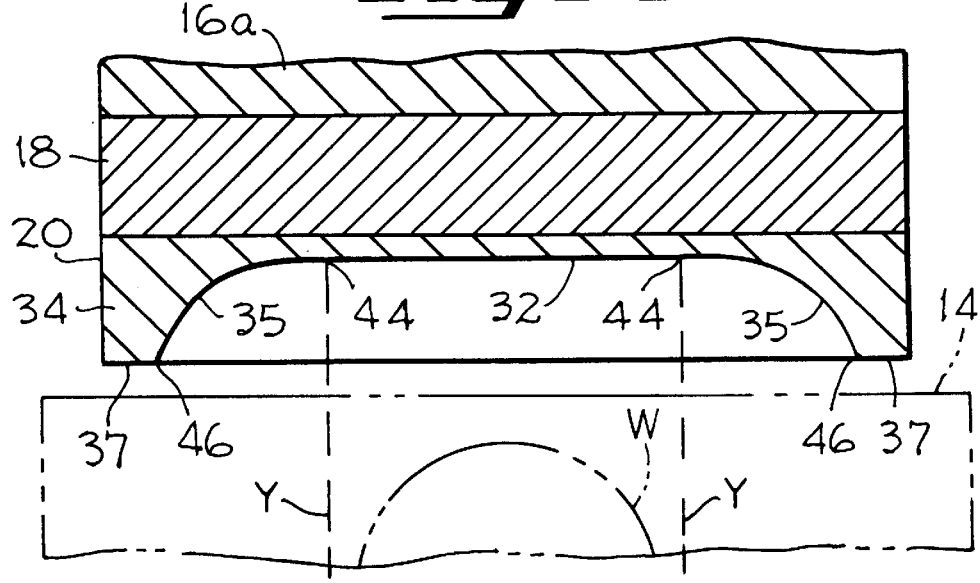

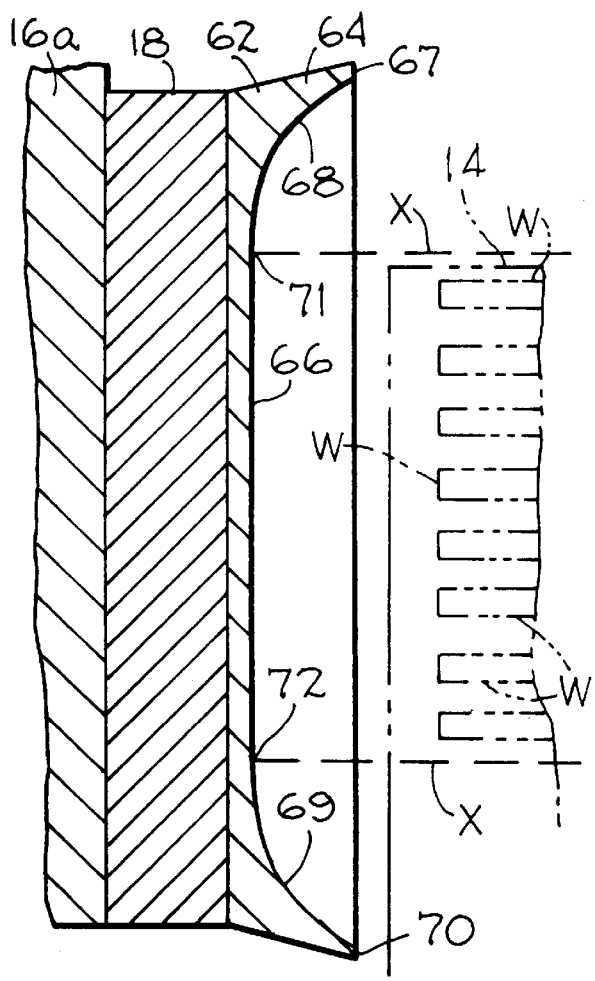
fig_6
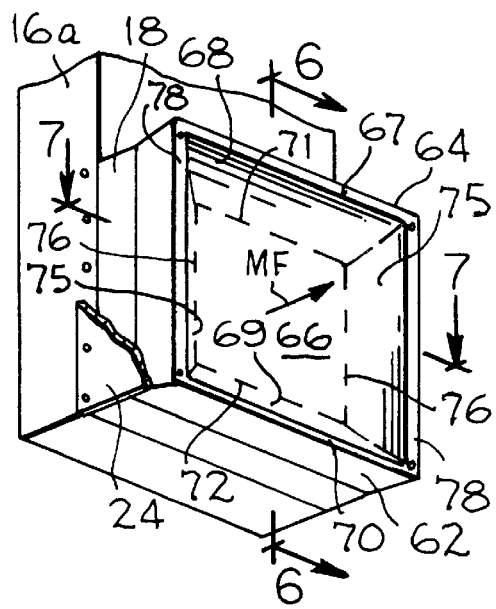
fig_5
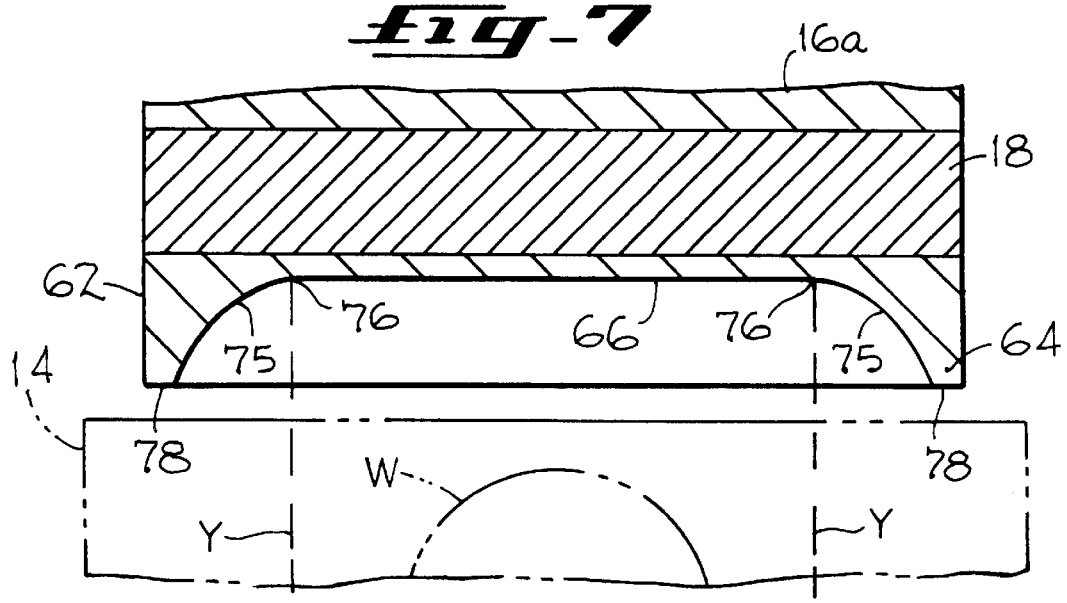
fig_7

DIPOLE MAGNETIC STRUCTURE FOR PRODUCING UNIFORM MAGNETIC FIELD

BACKGROUND OF THE INVENTION

1. Field of the Invention

The present invention pertains to magnet structures, and more particularly, it pertains to magnet structures for producing a uniform or homogeneous magnetic field within a predefined space such as might be used, for example, in the magnetization/annealing process in the manufacture of thin film magnetic heads.

2. Description of the Prior Art

Dipole magnet structures for producing a strong magnetic field have been used in various industrial or medical applications. For example, in the manufacture of magnetic read/write heads, the soft magnetic material which forms the core of the magnetic head is sputtered or otherwise deposited onto a substrate in a thin film layer and then is typically subjected to an annealing or heat treatment process. During this annealing process, a strong magnetic field is aligned with the axial direction of the thin film head deposition so as to generally align the domains of the soft magnetic material deposition layer so that the individual magnetic heads can produce strong flux fields when they are excited during subsequent read/write operations. Since the magnetic heads are individually quite small and are produced in large quantities (many thousands at a time) on a single deposition layer on a six-inch ceramic or silicon disk, and since a plurality of such disks in a spaced and aligned array are processed at the same time in an annealing oven, it will be apparent that the magnetic field which is utilized during the annealing process must be completely uniform and homogeneous in nature so that each of the individual magnetic heads will be properly aligned therein.

Such magnetic fields are generally produced by a pair of spaced magnetic poles or pole pieces which are arranged perfectly parallel to each other and which are caused to create a magnetic field therebetween either by means of large permanent magnets or by an electromagnetic structure. In order to prevent fringing or expansion about the edges of such magnetic field, which can result in non-uniformity across the field, the peripheral edges of the pole pieces are typically provided by an inclined, forwardly projecting surface. Such pole pieces as used in dipole magnet structures in the medical magnetic resonance imaging industry, for example, can be seen in prior U.S. Pat. No. 4,827,235 to Inomata et al and U.S. Pat. No. 5,754,085 to Danby et al.

SUMMARY OF THE INVENTION

With the dipole magnet structure of the present invention, it has been found that the uniformity of the magnetic field can be significantly increased by redesigning the poles or pole pieces of the magnet structure. In particular, it has been found that the peripheral rim about the periphery of each pole or pole piece that is used to prevent the fringing or bowing of the field at its periphery should be formed of a curved surface, and more particularly, a curved surface in the form of a polynomial curve which extends outwardly of the magnetic field a greater distance than it extends in the direction parallel to the magnetic field and which increases in curvature as it extends outwardly of the magnetic field. This structure has been found to significantly increase the uniformity or homogeneity of the field, and, with poles or pole pieces designed in accordance with the present invention, strong magnetic fields of a thousand to fifteen hundred gauss with complete uniformity throughout are produced which can be used in magnetic head field annealing production processes.

BRIEF DESCRIPTION OF THE DRAWINGS

FIG. 1 is a perspective view of the dipole magnet structure of the present invention particularly illustrating the magnet structure as used with an annealing oven in the manufacture of magnetic heads and with portions thereof being broken away for the purpose of illustration.

FIG. 2 is an enlarged isometric view of the dipole magnet structure of FIG. 1 with portions thereof being broken away for the purpose of illustration.

FIG. 3 is an enlarged section taken along line 3—3 of FIG. 2.

FIG. 4 is an enlarged section taken along line 4—4 of FIG. 2.

FIG. 5 is an isometric view of one of the poles of a second embodiment of the dipole magnet structure of the present invention with a portion thereof being broken away for the purpose of illustration.

FIG. 6 is an enlarged section taken along line 6—6 of FIG. 5.

FIG. 7 is an enlarged section taken along line 7—7 of FIG. 5.

DESCRIPTION OF THE PREFERRED EMBODIMENTS

FIG. 1 illustrates the dipole magnet structure 10 of the present invention which is shown as it might be used in its inverted U-shape in connection with the annealing process for thin film magnetic heads which are being heated in an oven 12. As can be seen, the magnet structure 10 is placed on the opposed sides of a rectangular upwardly projecting portion 14 of the oven into which a plurality of magnetic head-containing wafers W (FIG. 3) are placed in spaced vertical alignment. The magnet structure 10 may be placed upon a plurality of adjustable supports 15 on a flat upper surface 12a of the oven and appropriately horizontally aligned with the wafer-containing portion 14 of the oven so that the magnetic field from the magnet structure will be aligned with the thin layer of magnetic head material deposited on the flat upper surfaces of the wafers W.

The composition of the dipole magnet structure 10, which is more completely illustrated in FIG. 2, will be seen to be comprised of a yoke 16, a pair of permanent magnets 18, 19 affixed to the projecting ends of the yoke, and a pair of pole pieces 20, 21 secured in opposed relationship to the inner faces of the permanent magnets. The permanent magnets and pole pieces are completely enclosed within thin sheet metal covers 24 for their protection and to render them free from contamination (portions only of such covers being shown in FIGS. 1 and 2). These covers 24 may be sealed to prevent moisture from entering the pole piece-magnet areas also if this is required. Yoke 16 will be seen to be comprised of three solid steel sections rigidly bolted together including a pair of legs 16a and 16b which are secured in a spaced and parallel arrangement by a third, transversely extending leg 16c. Permanent magnets 18 and 19 are arranged to perfectly fit on the lower inner surfaces of the legs 16a and 16b, as shown, and to which their strong magnetic attraction securely affixes them. The inner opposed faces of the magnets 18 and 19 receive the pole pieces 20 and 21 respectively, and it will be noted that the outer dimensions of the magnets 18, 19 are exactly the same as those of the pole pieces 20, 21. Thus, a uniform magnetic field is provided, as indicated by the line MF in FIG. 2, in a closed loop path from magnet 18 through pole piece 20 and across the gap to pole piece 21 and magnet 19 with the return path being through the three legs of the yoke 16. The yoke portions 16a, 16b and 16c are formed of large solid steel sections so that there will be essentially no flux leakage losses in the return magnetic path since any such losses would affect both the intensity and the uniformity of the magnetic field in the gap between the pole pieces 20,21.

The important feature of the present invention is the construction of the pole pieces 20 and 21. These pieces, which are rectangular in shape to match the outer dimensions of the adjacent permanent magnets 18, 19, are formed of a magnetically conductive mild steel material, and their opposed faces are dish-shaped with each including a large flat face area surface 32 surrounded by a peripheral rim 34 projecting from the face area and forming the periphery of the pole piece.

With reference to the enlarged sectional view of FIG. 3, it is in the gap magnetic field MF which emanates at right angles from the face 32 of pole piece 20 where perfect uniformity or homogeneity is desired to correctly align the magnetic domains within the magnetic film deposited on wafers W that are undergoing annealing processing in the oven 14. As with any magnetic field passing through an air gap or nonmagnetic material, fringing effects, i.e., expansions or distortions of the field at the top, bottom and sides of the field, may occur and may result in distortions in the uniformity of the field within the enclosed spacial volume of the field. Thus, it has been conventional to provide a projecting rim about the edges of the flat face of each of the pole pieces in order to direct the flux emanating from the periphery back towards the center of the magnetic field so as to hopefully achieve uniformity in the magnetic field throughout its spacial volume, i.e, the space within which the object to be treated is inserted. As shown in the sectional views of FIGS. 3 and 4 this rectangular space is that between the pole piece faces 32 bounded by the horizontal planes X (FIG. 3) and the vertical planes Y (FIG. 4). In the present instance, and as shown in FIGS. 3 and 4, this treatment space includes that volume wherein the wafers W are inserted in alignment with the direction of the magnetic field.

I have found that the uniformity of the overall magnetic field in the critical spacial volume can be significantly improved by forming the peripheral surface of the rim portion of the pole piece from which the magnetic field emanates (surface 35 in FIGS. 3 and 4) and the rim portion of the pole piece (21, as shown) to which the field is directed in the form of a polynomial curve which extends outwardly of the inner face 32 in a direction parallel thereto a greater distance then it does in the direction perpendicular thereto and which increases in its degree of forward curvature as it extends outwardly of face 32. Thus, this curved surface 35 leading from the flat face 32 to the outer top surface 37 of the rim is formed of four polynomial curves which intersect at the corners of the pole piece, i.e., the vertical curved surface (FIG. 4) extending from the inner flat face 32 along line 44 to the outer rim surface along edge 46 at one side of the pole piece, a second curved surface 35 along the top of the pole piece extending from along line 36 at the inner face 32 to rim edge 38 (FIG. 3), the vertical curved surface 35 extending along the opposed vertical dimension of the pole piece which is the same as the curved surface between line 44 and edge 46 (FIG. 4), and curved surface 35 along the bottom of the pole piece extending from line 40 on the inner face to rim edge 42 (FIG. 3). Thus, the curved surface 35 of the pole pieces is formed of four interconnected curves which are not uniform in their dimensions due to the construction of the dipole magnet. As can be seen in FIG. 3, the flat, outer rim surface 37a at the upper edge of the pole piece is wider than the flat, outer rim surface 37b at the lower end thereof, and the curve between line 36 and edge 38 is shorter than the curve between lower line 40 and edge 42. This is due to the influence which the return path of the magnetic field through yoke portion 16c exerts on the magnetic field produced between the pole pieces. Likewise, the curves 35 along the sides of the pole piece (FIG. 4) are distinctive from the top and bottom curves 35.

Since the forward curvature clearly increases as perimeter surface 35 extends outwardly of the flat inner face 32, the formula for this curve has the general form of the polynomial $y = a + bx + cx^2 + dx^3$ . . . including the variable x raised to a power of two and/or greater. While it is thus apparent that a parabolic curve ($y = a + bx^2$) could be used, it has been found that a greater effect upon magnetic field homogeneity is obtained by including a term raised to the fourth power, i.e., in the general form $y = a + bx^2 + cx^4$.

By way of example, with a pole piece of 16½ inches in height and 16 inches in width, the rim surface 37a at the top of the pole piece is about 8/10 of an inch wide and the rim surface 37b at the bottom of the pole piece is about 4/10 of an inch wide with the rim surfaces 37 at the sides of the pole piece (FIG. 4) being each about 1 inch wide. The overall thickness of the pole piece (i.e., in the direction of the magnetic field) is about 2½ inches with the flat inner surface 32 being recessed about 2 inches in depth from the rim surface 37. The upper curved surface from line 36 to edge 38 covers the 2 inch depth in about 2.3 inches of vertical travel whereas the curved surface at the bottom of the pole piece from line 40 to edge 42 covers the 2 inch depth in about 2.7 inches of vertical travel. The curved surfaces 35 at the sides of the pole piece (FIG. 4) cover the 2 inch depth in 3½ inches of horizontal travel. Using permanent magnets of a relative size 18, 19 as shown, a magnetic field of 1300 gauss was provided across the gap between the pole pieces 20, 21.

It should be noted that while a flat inner face 32 is preferred, if the magnet structure is built of large dimensions, it may be necessary to form each of the opposed surfaces 32 of a slightly convex shape in order to insure homogeneity in the magnetic field throughout the larger spacial volume, i.e., the volume bounded by planes X and Y (FIGS. 3 and 4).

An alternative embodiment of the pole pieces of the magnet structure of the present invention is shown in FIGS. 5, 6 and 7. The essential construction of the dipole magnet structure of FIGS. 5–7 is the same as that of the aforedescribed embodiment of FIGS. 1–4 except for the construction of each of the pole pieces 62 (only one of which is shown) in the FIGS. 5–7 embodiment. As can be seen, pole piece 62 of the FIGS. 5–7 embodiment is similar to the pole piece 20 of the aforedescribed embodiment except that the projecting rim 64 which projects peripherally about the central flat face area 66 of the pole piece is inclined outwardly at both the bottom and the top of the pole piece so as to project outwardly slightly from the top and bottom horizontal surfaces of the adjacent permanent magnet 19 (FIG. 6). Thus, the peripheral curved surface 68 connecting the outer rim face 67 at the top of the pole piece with the flat inner face 66 of the pole piece along line 71 and the curved surface 69 connecting the outer rim face 70 at the bottom of the pole piece with the flat inner face 66 along line 72 are polynomial curves with increased degrees of curvature as they extend radially outwardly, and it will be observed that they are broader than the comparable curves 35 (FIG. 3) of the first described embodiment due to the extra length provided by the inclination of the peripheral rim edge at the critical top and bottom sections of the pole piece. At the sides of each pole piece 62 (FIG. 7) there are provided identical polynomial curved surfaces 75 which extend from vertical lines 76 to the outer vertical outer rim surfaces 78. With such an arrangement, the vertical dimension of the magnetic field (between planes X-X in FIG. 6) is the same as in the first described embodiment (FIGS. 1–4), but the greater length of the curved perimeter surfaces provide a more uniform field (between planes X-X); this, however, comes at the expense of a slight decrease in field intensity.

While it is preferred to use permanent magnets to produce the magnetic field in the magnet structure of the present invention in order to reduce the size and (especially) the heat generated, it will be recognized that electromagnet means may be used to generate the magnetic field within the gap area (i.e., the location of the wafers W) instead of permanent magnets 18, 19.

Although the best modes contemplated for carrying out the present invention have been herein shown and described, it will be apparent that other modifications and variations may be made without departing from what is regarded to be the subject matter of the invention.

What is claimed is:

1. A dipole magnet structure for producing a magnetic field within a predetermined spacial volume comprising first and second pole pieces disposed in spaced relationship and each having a face area and a rim extending entirely about the periphery of said face area, the rims of the pole pieces extending toward each other and including throughout their length a curved surface extending outwardly from the adjacent face area, and said face areas being disposed in alignment in parallel planes so as to define said predetermined spacial volume therebetween, said curved surface being defined by a formula whereby its projection in the direction parallel to the face area is greater than its projection in the direction perpendicular to the face area and increases in curvature as it increases in distance outwardly of the face area and wherein the distance in the direction parallel to the face area relative to the distance perpendicular to the face area includes a term raised to a power of two or more, a yoke member of magnetically conductive material connecting said pole pieces outside of said predetermined spacial volume so as to provide a complete magnetic circuit, and means for creating a magnetic field through said predetermined spacial volume, said rim and face areas of said pole pieces serving to make the magnetic field between the pole pieces uniform within said predetermined spacial volume.

2. A dipole magnet structure according to claim 1 wherein said means for creating a magnetic field comprises first and second permanent magnets mounted respectively between the first and second pole pieces and the yoke member.

3. A dipole magnet structure according to claim 2 wherein the outer dimensions of said pole pieces and said permanent magnets attached thereto in the directions transverse to the path of the magnetic field therethrough are substantially identical.

4. A dipole magnet structure according to claim 2 wherein said yoke member comprises a first portion secured to the first permanent magnet and extending in a first direction therefrom, a second portion secured to the second permanent magnet and extending in said first direction therefrom, and a third portion connecting said first and second portions and extending generally parallel to the magnetic field through said predetermined spacial volume.

5. A dipole magnet structure according to claim 2 wherein said permanent magnets are effective to generate a magnetic field of at least 1000 gauss within said predetermined spacial volume.

6. A dipole magnet structure according to claim 1 wherein each of said pole pieces comprises a unitary structure of a magnetically conductive material.

7. A dipole magnet structure according to claim 6 wherein each of said pole pieces is formed of an annealed steel.

8. A dipole magnet structure according to claim 1 wherein said formula term is raised to a power of four.

9. A dipole magnet structure for producing a magnetic field within a predetermined spacial volume comprising first and second pole pieces disposed in spaced relationship and each having a face area and a rim extending entirely about the periphery of said face area, the rims of the pole pieces extending toward each other and including throughout their length a curved surface extending outwardly from the adjacent face area, and said face areas being disposed in alignment in parallel planes so as to define said predetermined spacial volume therebetween, said curved surface being defined by a formula whereby its projection in the direction parallel to the face area is greater than its projection in the direction perpendicular to the face area and increases in curvature as it increases in distance outwardly of the face area, a yoke member of magnetically conductive material connecting said pole pieces outside of said predetermined spacial volume so as to provide a complete magnetic circuit, and means for creating a magnetic field through said predetermined spacial volume comprising first and second permanent magnets mounted respectively between the first and second pole pieces and the yoke member, each of said rims being bowed outwardly of the adjacent permanent magnet in at least a portion of its length, and said rim and face areas of said pole pieces serving to make the magnetic field between the pole pieces uniform within said predetermined spacial volume.

10. A dipole magnet structure for producing a magnetic field within a predetermined spacial volume comprising first and second pole pieces disposed in spaced relationship and each having a face area and a rim extending entirely about the periphery of said face area, the rims of the pole pieces extending toward each other and including throughout their length a curved surface extending outwardly from the adjacent face area, and said face areas being disposed in alignment in parallel planes so as to define said predetermined spacial volume therebetween, said curved surface being defined by a formula whereby its projection in the direction parallel to the face area is greater than its projection in the direction perpendicular to the face area and increases in curvature as it increases in distance outwardly of the face area, means for creating a magnetic field through said predetermined spacial volume comprising first and second permanent magnets mounted respectively between the first and second pole pieces and the yoke member, said rim and face areas of said pole pieces serving to make the magnetic field between the pole pieces uniform within said predetermined spacial volume, and a yoke member of magnetically conductive material connecting said pole pieces outside of said predetermined spacial volume so as so provide a complete magnetic circuit, said yoke member comprising a first portion secured to the first permanent magnet and extending in a first direction therefrom, a second portion secured to the second permanent magnet and extending in said first direction therefrom, and a third portion connecting said first and second portions and extending generally parallel to the magnetic field through said predetermined spacial volume, the rim of each of said pole pieces being defined by said curved surface and a flat outer rim surface extending outwardly from the curved surface and generally parallel to said face area of the associated pole piece.

11. A dipole magnet structure according to claim 10 wherein each of said pole pieces is generally rectangular in structure so that the rim thereof is formed of four interconnected sections enclosing the opposite ends of the magnetic field in said predetermined spacial volume.

12. A dipole magnet structure according to claim 11 wherein the section of the rim of each pole piece which is adjacent to said third portion of the yoke member is wider than the section of the rim opposite thereto.

13. A dipole magnet structure for producing a magnetic field within a predetermined spacial volume comprising a first pole piece of magnetically conductive material having a face area surrounded by a rim, a second pole piece of magnetically conductive material having a face area surrounded by a rim, said second pole piece being spaced from said first pole piece with said face areas of said first and second pole pieces extending parallel to each other in opposed relationship so as to define said predetermined spacial volume therebetween for the reception of an object to be subjected to a magnetic field, first and second permanent magnetic securely attached to said first and second pole pieces respectively with the magnetic orientations of such magnets being such as to provide a strong magnetic field across said predetermined spacial volume, and a yoke member of magnetically conductive material securely attached to said permanent magnets and extending therebetween outside of said predetermined spacial volume to provide a complete magnetic circuit, said rims of said first and second pole pieces including curved surfaces extending towards each other and outwardly from the face areas of their respective pole pieces so as to provide homogeneity in the magnetic field throughout said predetermined spacial volume, said curved surfaces being defined by a formula whereby their projection in the direction parallel to the face area is greater than their projection in the direction perpendicular to the face area and increases in curvature as it increases in distance outwardly of the face area, said rims of each of said pole pieces further being defined by a flat outer rim surface extending outwardly from the curved surface thereof and generally parallel to said face area of the pole piece.

14. A dipole magnet structure according to claim 13 wherein each of said pole pieces is generally rectangular in structure so that the rim thereof is formed of four interconnected sections enclosing the opposite ends of the magnetic field in said predetermined spacial volume.

15. A dipole magnet structure for producing a magnetic field within a predetermined spacial volume comprising a first pole piece of magnetically conductive material having a face area surrounded by a rim, a second pole piece of magnetically conductive material having a face area surrounded by a rim, said second pole piece being spaced from said first pole piece with said face areas of said first and second pole pieces extending parallel to each other in opposed relationship so as to define said predetermined spacial volume therebetween for the reception of an object to be subjected to a magnetic field, first and second permanent magnets securely attached to said first and second pole pieces respectively with the magnetic orientations of such magnets being such as to provide a strong magnetic field across said predetermined spacial volume, and a yoke member of magnetically conductive material securely attached to said permanent magnets and extending therebetween outside of said predetermined spacial volume to provide a complete magnetic circuit, said rims of said first and second pole pieces including curved surfaces extending towards each other and outwardly from the face areas of their respective pole pieces so as to provide homogeneity in the magnetic field throughout said predetermined spacial volume, said curved surfaces being defined by a formula whereby their projection in the direction parallel to the face area is greater than their projection in the direction perpendicular to the face area and increases in curvature as it increases in distance outwardly of the face area and wherein the distance in the direction parallel to the face area relative to the distance perpendicular to the face area includes a term raised to a power of two or more.

16. A dipole magnet structure according to claim 15 wherein the outer dimensions of said pole pieces and said permanent magnets are identical.

17. A dipole magnet structure according to claim 15 wherein said formula term is raised to a power of four.

\* \* \* \* \*